| United States Patent [19] | [11] Patent Number: 4,553,335 |
| --- | --- |
| Woyton | [45] Date of Patent: Nov. 19, 1985 |

[54] SHAFT ALIGNMENT DEVICE

[75] Inventor: Joseph T. Woyton, Mauldin, S.C.

[73] Assignee: Reliance Electric Company, Greenville, S.C.

[21] Appl. No.: 630,982

[22] Filed: Jul. 16, 1984

[51] Int. Cl.[4] .............................................. G01B 3/30
[52] U.S. Cl. ................................ 33/181 R; 33/DIG. 1
[58] Field of Search ................. 33/412, 181 R, 180 R, 33/DIG. 1

[56] References Cited

U.S. PATENT DOCUMENTS

| | | | |
|---|---|---|---|
| 2,636,273 | 4/1953 | Morris . | |
| 2,656,607 | 10/1953 | Harding . | |
| 2,815,582 | 12/1957 | Karstens | 33/180 R |
| 2,819,534 | 1/1958 | Kitzman | 33/172 R |
| 2,833,051 | 5/1958 | Cunningham . | |
| 3,174,302 | 3/1965 | Pomper . | |
| 3,664,029 | 5/1972 | Glucoft | 33/412 X |
| 4,115,925 | 9/1978 | Malak . | |
| 4,128,945 | 12/1978 | Barritt | 33/DIG. 1 |
| 4,161,068 | 7/1979 | McMaster . | |
| 4,367,594 | 1/1983 | Murray | 33/181 R |

FOREIGN PATENT DOCUMENTS

| | | | |
|---|---|---|---|
| 566250 | 12/1932 | Fed. Rep. of Germany . | |
| 972407 | 8/1950 | France . | |
| 828479 | 2/1960 | United Kingdom | 33/180 R |

OTHER PUBLICATIONS

Zurn Industries, Inc. catalogue, pp. 80–87.
Indiana General—Magnet Division, "Short Cut for Holding Magnet Design".
Mitutoyo Tool Co. catalogue, pp. 182–183 and 190–191.
IMS Brochure—"Mini Alignment Computer by IMS", Copyright 1981.
MMS Brochure (2) "Modular Hardware System" and Rotating Machinery Alignment System.
Hughes & Associates Training Brochure—1974 "Reverse Indicator Method of Alignment".
Optalign Bulletin, Dieter Busch & Co. (and translation) p. 5.
Optalign–The Laser-Optic Alignment, Lubrication Systems Company of Texas, Inc.
Photographs (2), Magnet Mount Shaft Alignment submitted by applicant, 8/9/84.

Primary Examiner—Harry N. Haroian
Attorney, Agent, or Firm—Marmaduke A. Hobbs

[57] ABSTRACT

A shaft alignment device for use in aligning two opposed, rotatable shafts connected by a shaft coupling is disclosed, having magnetic base portions adaptable for mounting on the shafts, hubs, or on auxiliary structures secured to the shafts or hubs. The device includes fixed bracket members with pivotally mounted swivel blocks therein. Extension beams project across the coupling from each swivel block to a reference surface on the facing bracket, and measurement indicators measure the degree of deflection of the swivel blocks. A leveling device indicates the relative position of the alignment devices for taking measurements at 0°, 90°, 180°, and 270°, and the coordinates obtained are used to plot the aligned positions of the shafts.

31 Claims, 26 Drawing Figures

SHAFT ALIGNMENT DEVICE

BACKGROUND OF THE INVENTION

Shaft couplings are often used to connect opposed, rotatable shafts in end-to-end relationship. The torque developed by the driving shaft is transmitted to the driven shaft through the coupling, as, for example, from a motor to a fan blower unit. This allows synchronous power transmission without the need for an additional motor, greatly lessens the cost of operation, and simplifies the motor control system. The coupled shafts must be precisely aligned in both the vertical and horizontal planes to effectively transmit the developed torque, to minimize wear on the couplings, seals, shafts, and bearings, and to minimize energy consumption, which increases greatly where misalignment is present and as it becomes progressively worse. Precise shaft alignment is difficult to obtain and even more difficult to maintain under operating conditions; however, for optimum performance, the center lines of the shafts should be both concentric and coinciding when the equipment reaches equilibrium operating condition.

Misalignment of the shafts can be angular where the projected center lines of the shafts intersect at an angle, or it can be parallel offset where the projected center lines of the shafts are parallel but are not concentric. These conditions may also exist simultaneously, and the shafts may exhibit both parallel and angular misalignment. Factors which may cause misalignment include uneven settling of the foundation beneath the components, expansion of the shafts or other affected elements due to the heat of operation, shaft deflection, wear on the coupling or in the bearings which affects clearance, and dimensional changes in the structural and rotating elements. Slight and unavoidable misalignments can be compensated for by the use of flexible couplings; however, these are not designed as substitutes for proper shaft alignment procedures. Operation of the machinery while misaligned causes early wear and, ultimately, failure of the flexible couplings also, especially in the flexible element itself.

Shaft alignment procedures are widely known and practiced in industry, and several methods are currently in use. Examples include the reverse indicator method, where measurement readings are made from one shaft to the other and then back again, generally considered to be the most accurate method; the rim and face method, in which the coupling is disassembled, and two dial indicators mounted on a beam are used for measurements against the rim and face of the exposed hubs; and even a trial and error procedure, using a straight-edge and calipers, in which readings are taken as in the rim and face method without disassembling the coupling, and the required calculations and graphical representations are foregone in favor of slight trial movements of the machinery. One of the shafts to be aligned is considered to be stationary and the other shafts are aligned to the stationary unit. Most current methods involve mounting a clamp on the fixed shaft, using upper and lower clamp halves connected by chains or long bolts which approximate the diameter of the shaft. Extending outwardly from the clamp is a rod, which connects to a second rod that extends horizontally across the coupling. A third rod is then extended from the second rod to the shaft to be aligned, and measurement indicators reflect the degree of misalignment in the horizontal and vertical planes. Readings are taken from the indicators, normally at ninety degree intervals, and the results are either plotted graphically or fed into a specially programmed computer. Either of these methods can be used to calculate the amount which the machine or component must be moved to align the shaft with the fixed reference shaft.

In some cases, clamps or similar members with measurement devices are secured to the coupling hubs, rather than to the shafts. The hubs mounted to the ends of the shafts are designed in many different shapes and sizes, and while some features are common to such hubs, in general, each manufacturer supplies a hub with a different external configuration. This raises some problems in attempting to mount an alignment device to the coupling hubs without modifying and/or standardizing certain features of the hubs to accept the alignment system. Even where possible, the cost of changing or modifying the hubs may be prohibitive, and downtime of the affected machinery substantial. Shaft-mounted systems may also suffer certain disadvantages. If there is a limited amount of available space on the shaft to mount the clamps, the coupling must be disassembled and removed before alignment can proceed. Replacing the coupling may then skew the alignment. Where large shafts are to be aligned, additional elements may be necessary, such as larger clamps and longer chains or bolts, requiring the stocking or availability of a plurality of different sized clamp members. Since the measurement apparatus must extend outwardly from the reference shaft to a point outside the coupling radius, and from there horizontally across the coupling to the second shaft, indicator sag effects, from the weight of the indicator on the extended rod, are normally a problem. While compensation factors for indicator sag effects have been developed, they are only an estimation and, therefore, introduce further uncertainty into the alignment equation. The cumulative effect of these disadvantages normally requires that several movements of the component to be aligned be undertaken before an acceptable shaft alignment is reached.

SUMMARY OF THE INVENTION

It is, therefore, one of the principal objects of the present invention to simplify the shaft alignment operation by providing an alignment device for coupled shafts adapted for mounting magnetically either on a shaft or on a coupling hub, or on a structure secured to the shaft or hub, which eliminates the need to stock a plurality of shaft-clamping members, which requires little, if any, shaft access, and which obviates the need to disassemble and remove the coupling.

Another object of the present invention is to provide for greater ease and stability in mounting the alignment device, with the base portion of the device having interchangeable hub contact tips, which substantially conform to the surface upon which they are mounted, and an end plate for proper axial positioning, the base portion serving to hold a bracket member with a measurement indicator mounted thereon, the bracket member also furnishing a reference surface for measurement by an indicator on the opposite side of the coupling.

A further object of the present invention is to minimize indicator sag effects, with as much as a 10 to 1 reduction being exhibited, due to mounting the measurement indicator on the fixed bracket, as opposed to mounting on the rod member which extends across the coupling, and to provide direct reading of one of the input parameters required for the alignment measurement using a marked, pivoting calibrated beam.

A still further object of the present invention is to provide a swivel block with an extension means associated therewith, which is easily adjusted axially or radially to accommodate various mechanical installations, yet has a minimum number of parts, and which provides for greater accuracy, thereby facilitating the alignment operation in the field.

These and other objects are attained by the present invention, which relates to a shaft alignment device for use in aligning coupled, rotatable elements having first and second magnetic base portions adapted for mounting on the respective rotatable elements. The device can be mounted on the shafts, on the coupling hubs, or on auxiliary structures secured to the shaft or hub. First and second bracket members are secured to their respective base portions, each having a pivotally mounted swivel block disposed therein. Extension means project radially from each swivel block to the bracket member on the opposite side of the coupling, and suitable measurement devices secured to the bracket members measure the degree of deflection of the swivel blocks relative to a fixed reference point.

Various other objects and advantages of the present shaft alignment device will become apparent from the following description, with reference to the accompanying drawings.

BRIEF DESCRIPTION OF THE DRAWINGS

FIGS. 7a through 14b illustrate variants of the contact shoe tips used in the present device to contact the hub or similar structure;

DETAILED DESCRIPTION OF THE PREFERRED EMBODIMENT

Figure 1:
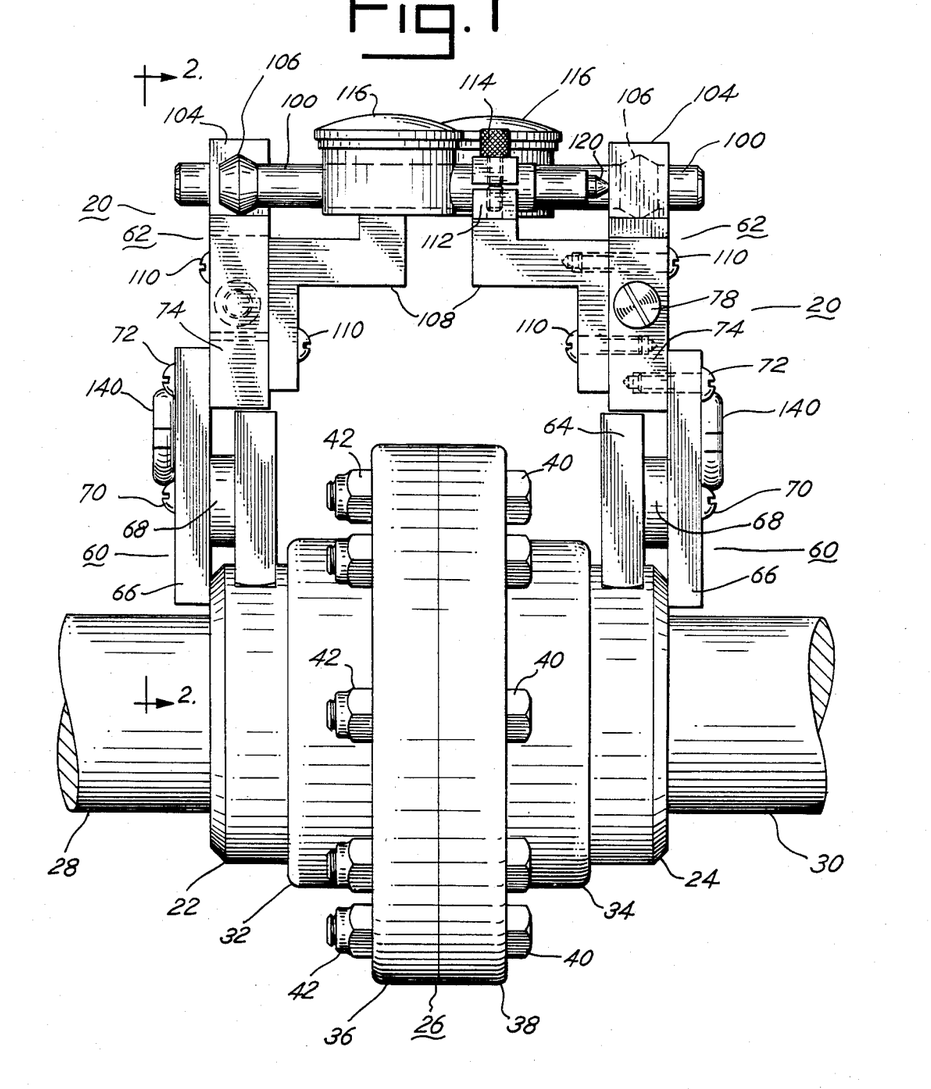
FIG. 1 is a side elevational view of a shaft coupling with two coupled shaft members secured therein, showing the shaft alignment device embodying the present invention mounted thereon.

Referring more specifically to the drawings, and to FIG. 1 in particular, numeral 20 designates generally the shaft alignment device embodying the present invention, shown here mounted on coupling hubs 22 and 24. The hubs are part of a shaft coupling 26, which is used for coupling a first shaft 28 in end-to-end relation with a second shaft 30. The shaft coupling includes a first sleeve member 32 and a second sleeve member 34, with radially extending annular flanges 36 and 38, respectively, the flanges being secured together by a plurality of bolts 40 and nuts 42. The present invention may be practiced with various types of rigid or flexible shaft couplings, coupling 26 being a conventional gear coupling shown here as an example of a generally suitable type. The present system has been designed to use the reverse indicator alignment method, generally considered to be the most accurate, and the preferred method in the industry. This procedure has, in the past, required a relatively high level of skill and knowledge on the part of the alignment mechanics, as well as a substantial amount of time; however, the present system has been simplified, both structurally and in the method of making measurements, thereby reducing the level of knowledge and skill and the amount of time required to successfully use the alignment device.

Figures 2, 3:
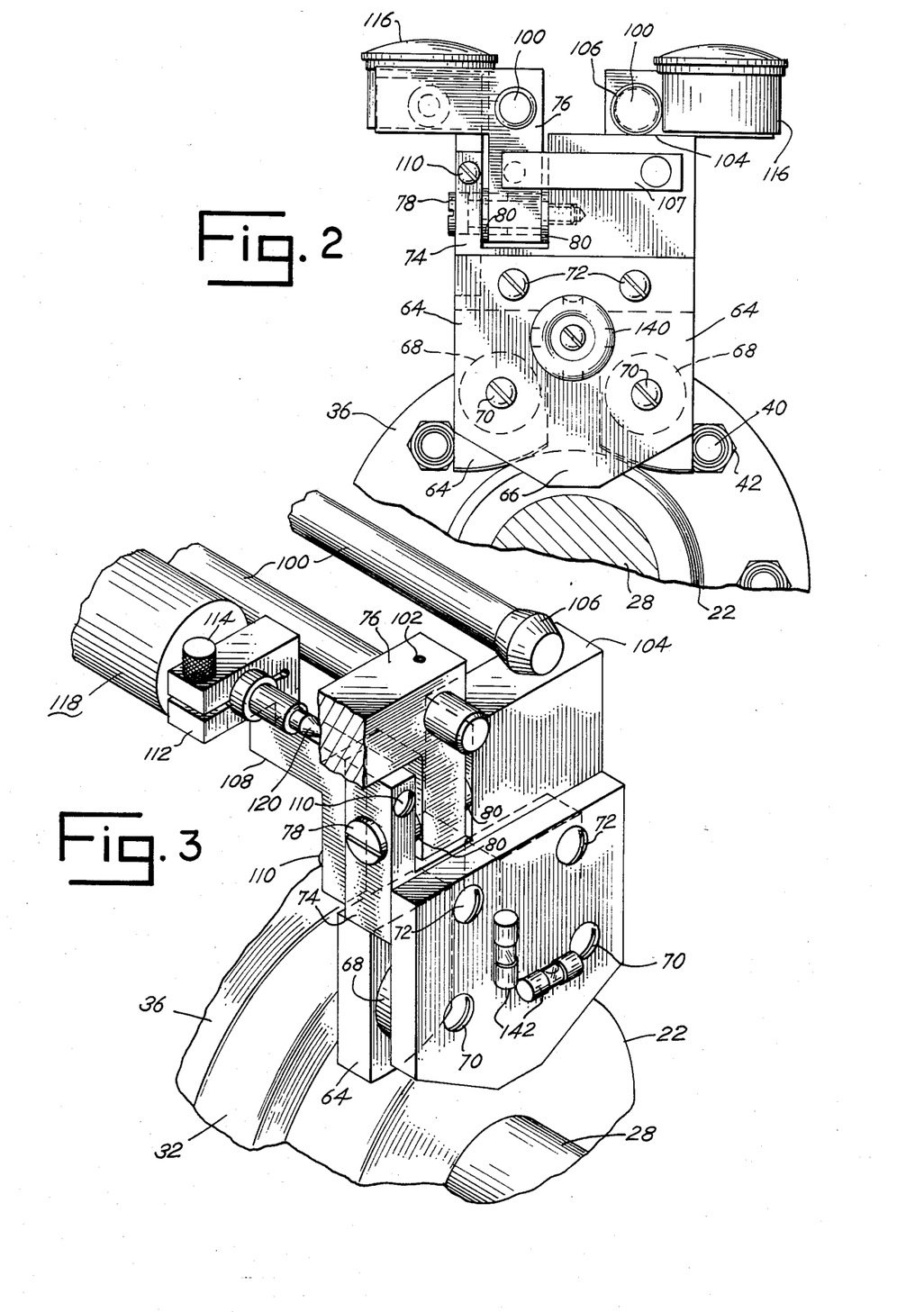
FIG. 2 is an end elevational view, shown partially in cross-section, showing the upper half of the shaft coupling and mounted shaft alignment device shown in the preceding figure, the view being taken from line 2—2 of FIG. 1.
FIG. 3 is an isometric view of the mounted shaft alignment device shown in the preceding figures.

The present device 20 is designed to be magnetically attached either to a coupling hub, to an auxiliary structure secured to the hub or the shaft, or, in a modified form, directly to the shaft. The device includes a lower or base portion 60, for securing the device to a particular structure, and an upper portion 62, which is used for obtaining the coordinates used to plot the actual position of the coupled shafts. As shown in FIGS. 1 through 3, a preferred embodiment includes a substantially identical device 20 mounted on each side of the coupling; however, accurate measurements may also be made using only one device as described hereinafter.

Figure 4:
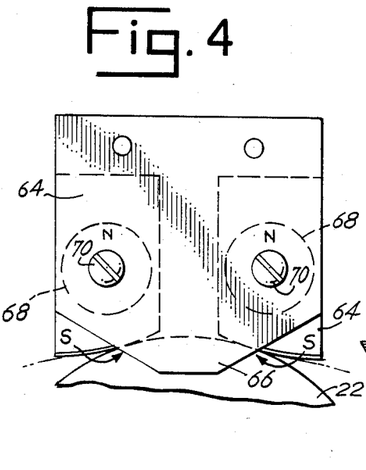
FIG. 4 is a fragmentary end elevational view of the magnetic base portion of the present shaft alignment device, illustrating the dual magnetic flux paths.
Figure 5:
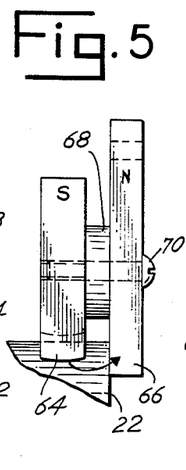
FIG. 5 is a fragmentary side elevational view of the magnetic base portion, further illustrating the magnetic flux path.
Figure 6:
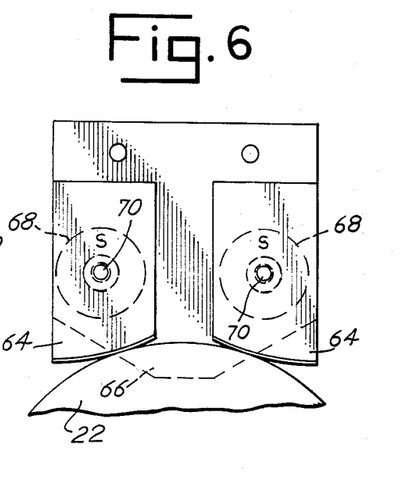
FIG. 6 is a fragmentary end elevational view of the magnetic base portion, illustrating the opposite side of the portion shown in FIG. 4.

The base portion 60 includes contact tips 64 which abut the outer circumferential surface of the structure upon which they are mounted. A backing plate 66 provides proper axial positioning adjacent the outer face of the hub or other structure. Disposed between the backing plate and the contact tips are magnets 68 of a suitable permanent magnetic material, such as rare earth cobalt, for example. The contact tips and the backing plate serve as pole pieces and are composed of mild steel, with high permeability, such that the magnet can easily establish a magnetic field or flux path through the mild steel elements. As shown in FIGS. 4 through 6, the field is directed from the magnet into the contact tip, and from there to the hub or other structure. The field is then directed from the hub, through the backing plate and back to the magnet. This effect is multiplied, due to the provision of multiple magnets in each base portion 60, thereby setting up multiple magnetic fields to increase the holding power of the assembly. Thus, the contact tips may function as south poles or pole pieces in the magnetic field, while the backing plate may function as a north pole or pole piece, polarity, of course, being reversible if desired, but providing the same holding effect. This contrasts with a conventional magnetic clamp which normally has a north pole on one side of the supporting structure and a south pole on the opposite side, the flux path in such an arrangement traveling through the upper surface of the supporting structure only. The conventional clamp thus has limited application, being generally unstable, and especially unsuitable for purposes of the present invention. The base portion must be rigidly secured to the hub or similar structure to provide the stability and positioning necessary for accurate measurements. The unique magnet array disclosed by the present invention provides the requisite security, since the backing plate is attracted to the face of the hub, while the contact tips are attracted to the outer circumferential surface of the hub, providing magnetic attraction force in both radial and axial directions from both right and left sides of the base portion 60. Non-magnetic fastening means, such as screws 70, are used to secure the contact tips, magnets, and backing plate together in the base portion.

Additional non-magnetic fastening means, such as screws 72, are used to secure the upper portion 62 of the present device to the base portion. The upper portion includes a generally U-shaped bracket member 74, which is fastened to plate 66 with screws 72. Pivotally mounted within the recess formed in the U-shaped bracket is a swivel block 76, fastened therein by suitable means, such as shoulder screw 78. The swivel block pivots relative to the shafts on the shoulder screw, lateral movement or wobble being prevented by the use of flanged bushings 80, or other suitable means, disposed around the shoulder screw and in the interstices between the bracket member 74 and the swivel block 76. Slidably mounted within the swivel block is an extension means, such as beam 100, which may be marked and calibrated for distance measurements, and can be slid axially to accommodate installations of varying size by loosening set screw 102. The beam extends radially from the swivel block to a reference surface portion 104 of the U-shaped bracket member 74 on the opposite side of the coupling where a contact means or foot 106, secured to the end of the beam, contacts the reference surface portion. Foot 106 is urged into contact with the reference portion by a suitable biasing means associated with the swivel block, such as spring 107, which has one end secured to the swivel block and the other end secured to the bracket member 74. A support bracket 108 is also secured to the U-shaped bracket member with suitable means, such as screws 110. Formed in the end of the support bracket, opposite the fastened end, is a clamp means 112 with a thumb screw 114 for holding a suitable measurement indicator. The indicator may be, for example, a dial indicator 116, as shown in FIGS. 1 and 2, or a measurement transducer or linear variable differential transformer (L.V.D.T.) of the type indicated generally at 118 in FIG. 3. The indicators have a pointer means 120 extending therefrom to contact swivel block 76. With foot 106 disposed against the reference surface portion 104, the indicators measure the degree of deflection of the swivel block 76 relative to the reference surface portion of the opposite, facing bracket member, which value is recorded and used in plotting the actual position of the shafts. The measurements are made in both directions, from left to right and right to left, with the beam 100 from each side extending to the reference surface portion on the opposite, facing bracket member. The degree of deflection of each swivel block is obtained from the indicators and recorded at ninety degree intervals around the coupled shafts. The present device can also provide accurate measurements using only one assembly by providing a contact foot (not shown) on the free end of the beam, in place of foot 106, that extends radially from the beam to the outer circumferential surface of the hub, and measuring the deflection of the swivel block as described above.

As noted earlier, most measurement procedures involve taking measurements at 0°, 90°, 180°, and 270°, either by rotating the coupling or by removing and repositioning the measurement assembly at ninety degree intervals. This provides the coordinates in both the vertical and horizontal planes which permit the plotting of the actual position of the coupled shafts, the top and bottom readings, 0° and 180°, being used for alignment in the vertical plane, and the side readings, 90° and 270°, being used for alignment in the horizontal plane. Reference marks at ninety degree intervals are normally placed on the hubs and on a proximal stationary element, such as the machinery casing, and the coupling is rotated to align the reference marks, usually along the line of sight of the alignment mechanic. The imprecision of this procedure is eliminated in the present invention through the provision of level indicators, such as the circular bubble indicator 140, shown in FIGS. 1 and 2, or the orthogonal bubble tubes 142, shown in FIG. 3. Reference marks are provided on the circular leveling device and used to align the bubble within the marks as the coupling and attached alignment device are rotated. With the tubular leveling device, the bubble is aligned in the middle of one of the tubes as the coupling is rotated, or after the device is removed and repositioned. Thus, the need to mark the hubs or machinery casing is eliminated, and the leveling devices provide precise indication of the position of the coupling relative to the starting point, which, due to the leveling devices, can be at any position on the hub or other structure. This greatly simplifies the alignment procedure, maximizes the precision of the alignment, and minimizes the expense and the down-time of the affected machinery.

Figures 7A, 7B:
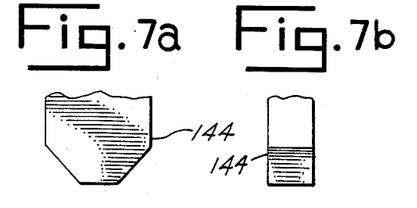
Figures 8A, 8B:
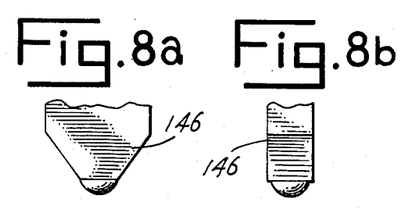
Figures 9A, 9B:
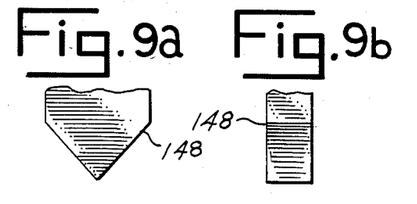
Figures 10A, 10B:
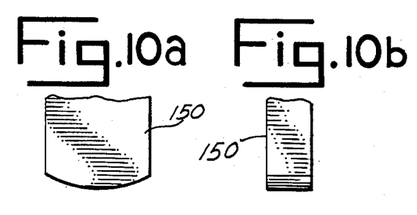
Figure 11A:
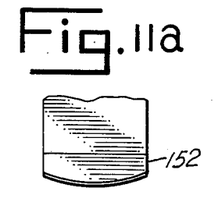
Figure 11B:
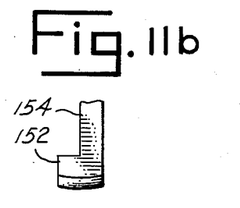
Figure 12A:
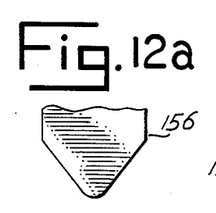
Figure 12B:
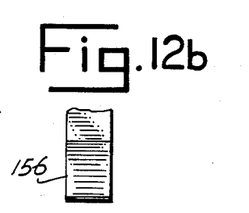
Figure 13A:
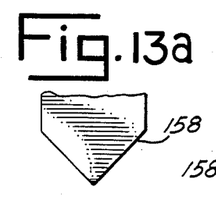
Figure 13B:
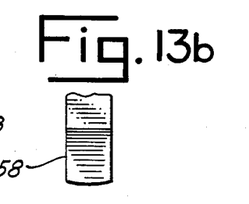
Figures 14A, 14B:
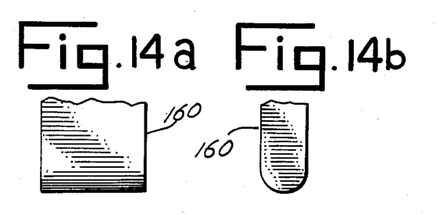

Due to the many different external configurations of coupling hubs, a variety of hub contact tips are provided for accommodating irregular structures, which can be easily substituted for tip 64 by removing screws 70 and fastening a different tip in its place. Tip 64 illustrates an offset design which, as indicated in FIG. 4, can accommodate annular structures of both large and small diameter. FIGS. 7a and 7b illustrate a truncated tip 144; FIGS. 8a and 8b illustrate a domed tip 146; FIGS. 9a and 9b illustrate a knife-edged tip 148; FIGS. 10a and 10b illustrate a simple curved tip 150; and FIGS. 11a and 11b illustrate a compound curved tip 152. Tip 152 is a modified form that has a portion of the inner surface removed, indicated at 154, to recess the magnet therein and reduce the width of the base portion to accommodate installations having limited space, or for use with a switchable magnet assembly as detailed below. This may also be done with any of the tips shown with no reduction in the holding power of the magnetic assembly or change in the direction of the magnetic field. FIGS. 12a and 12b illustrate a first type of cylindrical tip 156; FIGS. 13a and 13b illustrate a curved knife-edge tip 158; and FIGS. 14a and 14b illustrate a second type of cylindrical tip 160. Tips 64, 146, 152, 158, and 160 have been found to best accommodate irregularly curved external surfaces of hubs or other structures, while the other tips best accommodate regularly curved or angular surfaces.

Figures 15, 16:
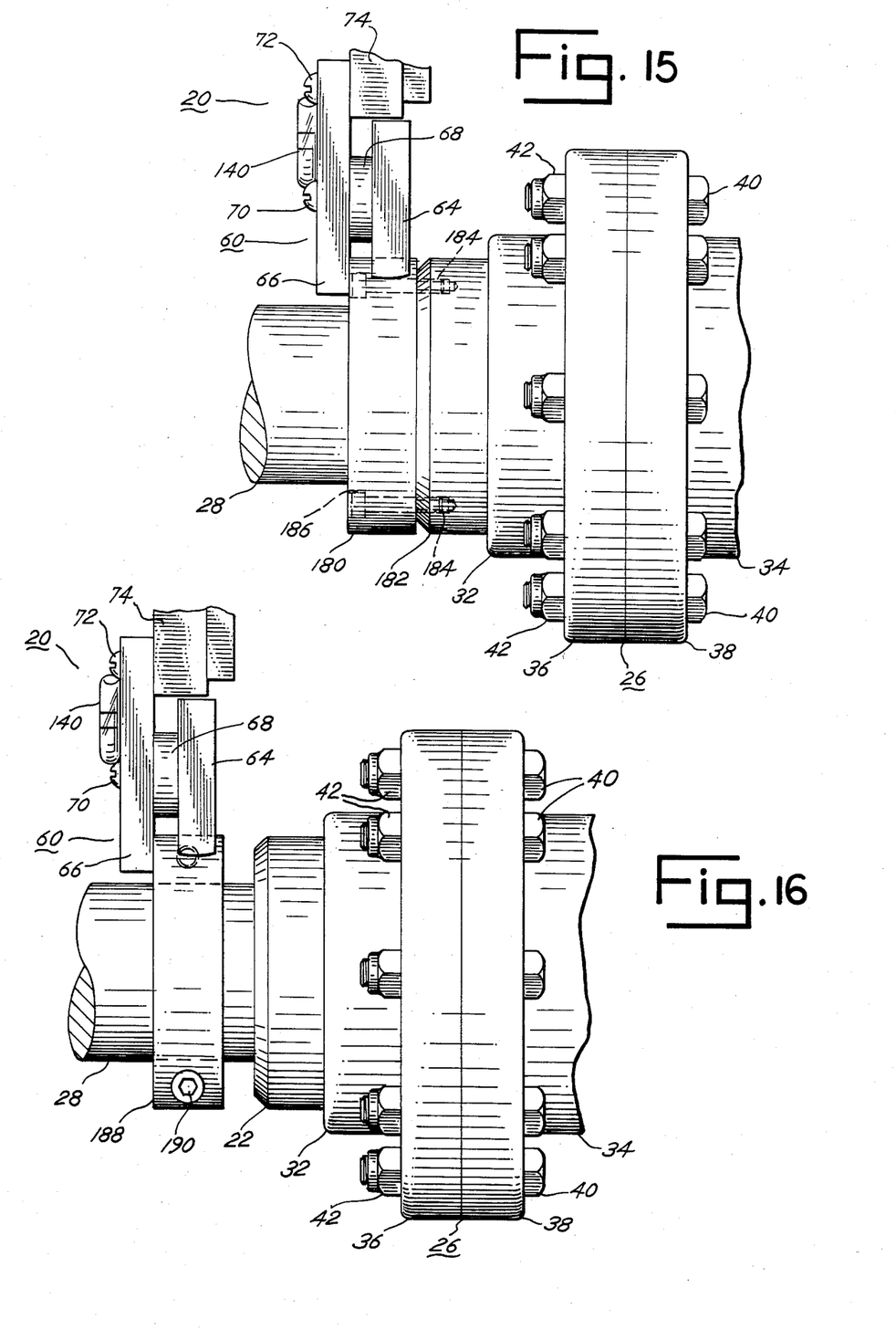
FIG. 15 is a fragmentary, side elevational view of the present shaft alignment device, here mounted on an auxiliary ring secured to the hub.
FIG. 16 is a fragmentary, side elevational view of the present device, shown here mounted on an auxiliary ring secured to the shaft.

FIGS. 15 and 16 illustrate examples of alternative mounting embodiments for the present shaft alignment device. In FIG. 15, the device 20 is mounted on an auxiliary member, such as ring 180 fastened to a modified coupling hub 182. Hub 182 may include threaded axial bores 184 therein for receiving bolts or screws 186 which secure member 180 to the hub. The diameters of the hub and member 180 are shown here as identical, but this is not a necessary condition, and accurate measurements can still be made if the diameters differ. In FIG. 16, the present device 20 is shown mounted on an auxiliary clamp member 188 secured to the shaft 28. Clamp 188 may be of any suitable type, such as the split ring shown here, which is secured around the shaft with bolts or screws 190. Similarly, the diameters of the hub and clamp 188 may differ, and clamp 188 or ring 180 need not be annular, as shown here, accurate measurements being possible in either case.

Figure 17:
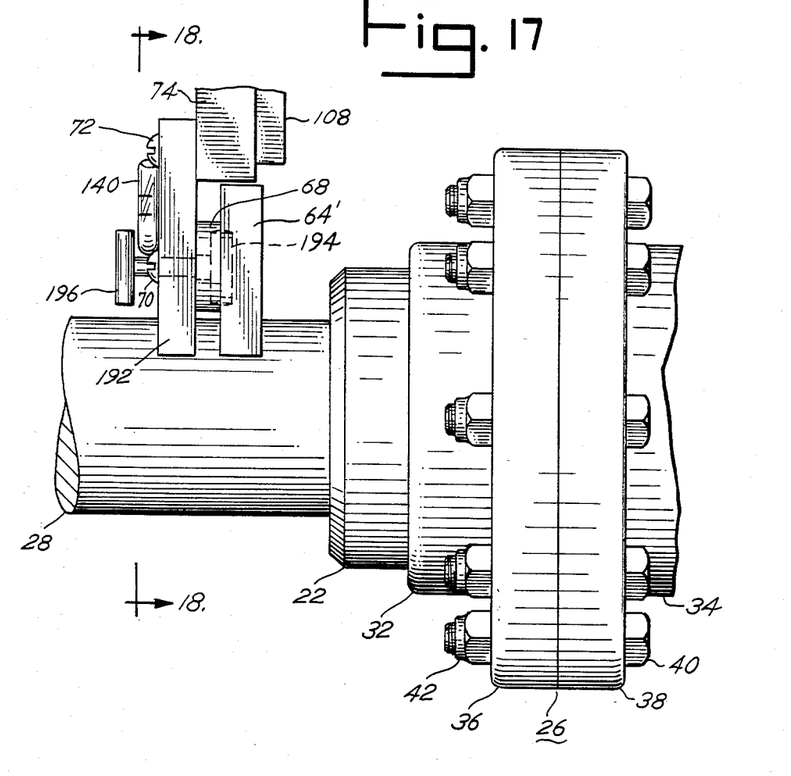
FIG. 17 is a fragmentary, side elevational view of a modified form of the present invention, adapted for mounting on the shaft and including a switchable magnetic base portion.
Figure 18:
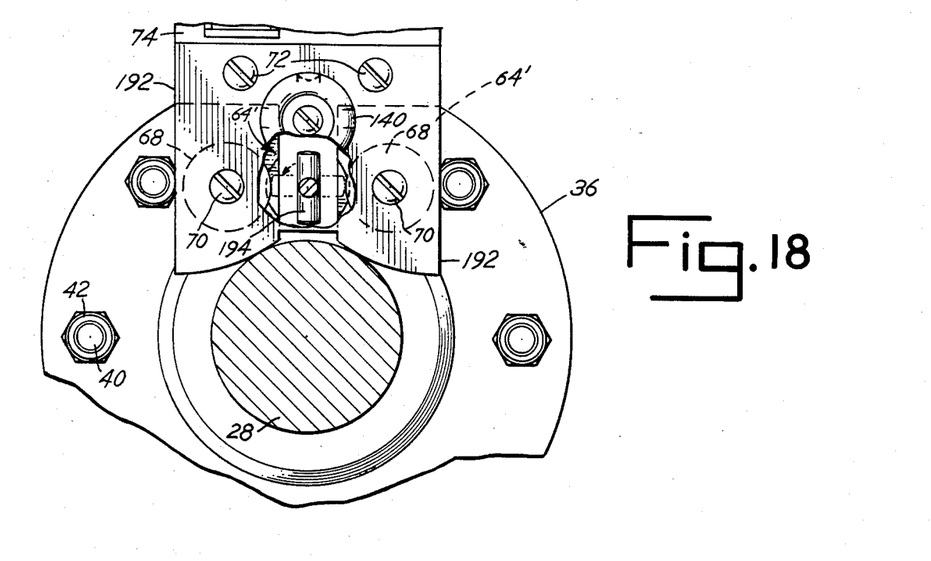
FIG. 18 is a fragmentary, end elevational view, shown partially in cross-section, of the modified form of the invention shown in the preceding figure, the view being taken from line 18—18 of FIG. 17.

A modified form of the present invention, designed to be mounted on a shaft, is shown in FIGS. 17 and 18. In this embodiment, a modified plate member 192 is substituted for plate 66. The portion of plate member 192 that contacts the shaft 28 is modified to have essentially the same configuration as the contact tips 64' on the opposite side of magnets 68. Contact tips 64' have been modified to accommodate a switching device for the magnet assembly by removing a portion of the inner edges of the tips. Disposed in the recess formed therein is a switch means of magnetic material, such as a steel cylinder 194. The cylinder or similar object, when in the position shown in FIG. 18, has no effect on the magnets, and the flux path is essentially similar to that previously described. The magnetic field travels from contact tip 64' into the shaft, from there to plate 192, and back again to the magnet. This pattern is duplicated on both sides of the base portion of the alignment device, providing a very stable and secure mounting. The cylinder is connected to a rotatable handle means 196 which, when rotated ninety degrees, moves the cylinder into contact with both magnets, the position indicated by the dotted lines in FIG. 18. With contact established, the magnetic field travels through the cylinder between the magnets, instead of through the shaft, since the flux will take the path of least resistance, thereby reducing the magnetic attraction to the shaft to approximately five percent of the unswitched holding force, thus facilitating removal of the device from the mounting structure. The switch means may also be incorporated into the other embodiments disclosed herein by modifying the contact tips and the base portion, as described hereinabove, or electromagnets with a suitable power source may be substituted to serve the same purpose.

In the use and operation of the present shaft alignment device, the machinery containing the shafts to be aligned is checked to ensure solid footings, since this is where the adjustments will be made, and one of the shafts is chosen as a reference and considered fixed. The remaining shafts in the power transmission arrangement are then aligned to the first, or reference shaft. Either one or two bracket members may be used for making any of the alignment measurements and calculations, as a matter of choice, convenience, or as dictated by the particular requirements of the installation. Both in theory and design, as few as one bracket member, or as many as eight bracket members, may be used in the present system; however, the most common, efficient, and economical procedure will employ two bracket members. If two bracket members are used, measurement readings are normally made from one bracket to the other. If one bracket member is used, measurement readings may be made by using a contact means, such as a contact foot (not shown), in place of foot 106, which is slidable along beam 100 and extends from the beam to contact the distal coupling hub opposite the mounted device.

As noted earlier, the present shaft alignment device has been designed to use the reverse indicator alignment method. This method involves first measuring the distance between the outer and inner feet of the machines, between the inner feet and the face of the coupling hub, and between the faces of the two coupling hubs, the latter of which may be determined directly from the marked, calibrated beam 100. To this data are added thermal rise figures, which are standards indicating the relative movement of the machinery due to the heat of operation, and, normally, figures which take into account indicator sag. Measurement readings are then taken from one side to the other and back again at ninety degree intervals around the shaft or hub, aided by the leveling devices 140 or 142. The top and bottom readings are used for computing vertical alignment, and the side readings are used for computing horizontal alignment. The collected data are then either plotted graphically, or fed to a calculator or computer, to calculate the movements of the machinery necessary to align the shafts.

For purposes of description, assume shaft 28 is the fixed, or reference, shaft. The coupling, such as coupling 26, is assembled on the opposed ends of the shafts. The alignment device 20, with the magnetic base portion 60, is then placed against the upper surface of one of the coupling hubs 22 or 24 and centered, using the leveling device 140 or 142. A second device 20 is placed on the upper surface of the opposite hub and centered, again with reference to the leveling devices. The spring-loaded swivel blocks 76 urge each foot 106 on the end of the beams 100 against the reference surface portions 104 of the respective U-shaped bracket members 74, the beams having been adjusted for length. The deflection of the swivel blocks is measured by the dial indicator 116, or a similar device, and the value is either recorded graphically or input into a computer memory. The coupling is then rotated 90°, as indicated by the leveling devices, and measurements are made at this point, at 180° and at 270°. Normally, at this point in the procedure, corrections must be made for indicator sag effects. This is due to the fact that the prior art systems had the dial indicators, or other devices, mounted on the free end of the radial extension means or beam. This mass causes the beam to deflect, and distorts the reading taken at the 180° position. The present system, however, minimizes this problem, since beam 100 supports no more than its own weight and the minimal weight of foot 106 or a similar element, exhibiting a 10:1 reduction in indicator sag effects. In addition, the swivel block 76 is spring loaded to counteract the effects of gravity upon the beam 100 or the contact feet. The coordinates obtained are then used to plot the actual positions of the coupled shafts. This information is then used to calculate which and by how much each component machine must be moved or shimmed to place the shafts in alignment. After the shimming process is completed, alignment is normally re-checked to ensure the accuracy of the movements.

Where the shafts to be aligned can not be rotated, the device 20 may simply be removed from its mounted position and repositioned ninety degrees from the previous mounting site, as indicated by the leveling device. This process is facilitated by the switchable magnetic base portion shown in FIGS. 17 and 18, in which the attraction force of the magnets can be effectively short-circuited, the cylinder 194 or a similar device providing a path of lesser resistance and diverting the magnetic field away from the hub, shaft, or a structure secured to the hub or shaft. The present device may also be mounted adjacent the coupling hubs using either an auxiliary member, such as ring 180, secured to the hub, or a type of clamp, such as clamp member 188, secured to the shaft. In a modified form, the device may be mounted directly on the shaft. Axial positioning plate 66 is replaced by a modified plate 192, which has a shaft-contacting surface similar to that of the contact tips 64 or 64'. The dual, circular magnetic field path is retained in the modified device, thereby providing a secure and stable mounting on the shaft, without the need for clamps, long chains, bolts, or screws, to secure the device. Alignment procedures are facilitated, since there is no assembly required as with prior art systems, regardless of shaft or coupling size. The only adjustment that may be required is the substitution of one pair of contact tips for a different pair, before alignment procedures begin, to more nearly conform to the surface upon which the tips are mounted.

While one embodiment and several modifications of a shaft alignment device have been shown and described in detail herein, various other changes and modifications may be made without departing from the scope of the present invention.

I claim:

1. An alignment device for use in axially aligning first and second rotatable elements, comprising:
   a. a first magnetic base portion for mounting on the first rotatable element;
   b. a second magnetic base portion for mounting on the second rotatable element;
   c. first and second bracket members secured to said first and second base portions, respectively;
   d. first and second pivotally mounted swivel blocks disposed in said respective bracket members;
   e. a first extension means projecting from said first swivel block to said second bracket member for sensing the position of said second rotatable element;
   f. a second extension means projecting from said second swivel block to said first bracket member for sensing the position of said first rotatable element; and
   g. at least one measurement device selectively mounted on either of said bracket members for detecting the degree of deflection of each of said swivel blocks and hence the position of said rotatable elements relative to one another.

2. An alignment device as defined in claim 1 in which each of said magnetic base portions includes a magnet disposed therein and a pole piece disposed adjacent said magnet for establishing a magnetic field between said base portions and the rotatable elements.

3. An alignment device as defined in claim 2 in which said pole piece includes a contact means associated with said magnet for contacting the rotatable elements, and a backing plate disposed adjacent said magnet on the side opposite said contact means.

4. An alignment device as defined in claim 1 in which said bracket members have essentially a U-shape, and said swivel blocks are disposed within the recess in said bracket members.

5. An alignment device as defined in claim 4 in which said swivel blocks include a biasing means for urging said extension means into contact with said bracket members.

6. An alignment device as defined in claim 1 in which said extension means include marked, calibrated beams, each having a proximal and a distal end, said proximal ends being slidably mounted in said respective swivel blocks for adjusting the length of said beams.

7. An alignment device as defined in claim 6 in which each of said beams includes a pointed contact foot secured to said distal ends of said beams for contacting said bracket members.

8. An alignment device as defined in claim 1 in which said measurement device is mounted on said first bracket member and a second measurement device is mounted on said second bracket member.

9. An alignment device as defined in claim 1 in which a position-indicating device is included therein for determining a starting position for the alignment procedure and determining the position of said device relative to the starting position.

10. An alignment device as defined in claim 9 in which said position-indicating device is a fluid-filled bubble level.

11. An alignment device as defined in claim 1 in which said rotatable elements are a pair of shafts in end-to-end relation.

12. An alignment device as defined in claim 1 in which said rotatable elements are coupling hubs.

13. An alignment device as defined in claim 1 in which said magnetic base portions include switch means for controlling the path of the magnetic field produced by said base portions.

14. An alignment device for use in axially aligning two opposed rotatable elements, said device comprising:
   a. a magnetic base portion for mounting on one of the rotatable elements;
   b. a bracket member secured to said magnetic base portion;
   c. a swivel block pivotally mounted within said bracket member;
   d. an extension means projecting from said swivel block and having a distal end for sensing the position of the rotatable element opposite the rotatable element upon which said base portion is mounted; and
   e. a measurement device secured to said bracket member for measuring the degree of deflection of said swivel block relative to the position of said opposite rotatable element.

15. An alignment device as defined in claim 14 in which said extension means includes a contact means mounted on said distal end and projecting therefrom to said opposite rotatable element.

16. An alignment device as defined in claim 14 in which said magnetic base portion includes a plurality of interchangeable contact tips for engaging the outer mounting surface of the rotatable elements.

17. An alignment device as defined in claim 14 in which said magnetic base portion includes a pair of magnets and pole pieces disposed on both sides of said magnets for establishing a magnetic field between said base portion and the rotatable elements.

18. An alignment device as defined in claim 17 in which said pole pieces include a pair of contact tips for engaging the outer mounting surface of the rotatable elements, each one of said tips associated with a respective one of said magnets, and a backing plate disposed adjacent said magnets on the side opposite said contact tips.

19. An alignment device as defined in claim 14 in which the rotatable elements are coupling hubs.

20. An alignment device as defined in claim 14 in which the rotatable elements are shafts.

21. An alignment device as defined in claim 19 in which the rotatable elements include auxiliary members secured to the coupling hubs.

22. An alignment device as defined in claim 20 in which the rotatable elements include auxiliary members secured to the shafts.

23. In a shaft alignment device mountable on a rotatable element, a magnetic base portion comprising:
   a. a magnet means for creating a magnetic field for holding said base portion against the rotatable element;
   b. contact means disposed adjacent said magnet means and having an outer surface for engaging the mounting surface of the rotatable element; and
   c. plate means disposed adjacent said magnet means on the side opposite said contact means and having a contact point for engaging a surface area of said rotatable element.

24. In a shaft alignment device as defined in claim 23, a magnetic base portion in which said portion includes a switch means for changing the path of the applied magnetic field generated by said magnet means.

25. In a shaft alignment device as defined in claim 23, a magnetic base portion in which said contact means include first and second contact tips having high magnetic permeability.

26. In a shaft alignment device as defined in claim 23, in which said rotatable element has an outer surface and a face portion, a magnetic base portion in which said contact means abut the outer surface of said rotatable element, and said plate means abuts the face portion of said rotatable element.

27. In a shaft alignment device as defined in claim 23, in which said rotatable element is a shaft, a magnetic base portion in which said plate means has an outer surface for engaging the outer circumferential surface of the shaft.

28. An alignment device for use in axially aligning two opposed rotatable elements, said device comprising:
   a. A magnetic base portion for mounting on one of the rotatable elements;
   b. a bracket member secured to said magnetic base portion;
   c. pivoted means on said bracket for sensing the position of the rotatable element opposite the rotatable element upon which said base portion is mounted; and
   d. a measurement device disposed on said bracket member and engaging said pivoted means for sensing the angular position of said pivoted means to measure the axial position of said one rotatable element relative to the axial position of said opposite rotatable element.

29. In a shaft alignment device as defined in claim 28, in which said magnetic base portion has contact means including first and second contact tips with arcuate surfaces for contacting the peripheral surface of said rotatable element.

30. In a shaft alignment device as defined in claim 28, in which said rotatable element has an outer surface and a face portion, and said magnetic base portion has a contact means for abutting the outer surface of said rotatable element and a plate means for abutting the face portion of said rotatable element.

31. In a shaft alignment device as defined in claim 28, in which said magnetic base portion includes a switch means for changing the path of the applied magnetic field generated by said magnet means.

* * * * *